(12) United States Patent
Okayama

(10) Patent No.: US 6,701,033 B2
(45) Date of Patent: Mar. 2, 2004

(54) OPTICAL SWITCH ELEMENT AND WAVELENGTH ROUTER

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 59 days.

(21) Appl. No.: 09/847,398

(22) Filed: May 3, 2001

(65) Prior Publication Data

US 2002/0025105 A1 Feb. 28, 2002

(30) Foreign Application Priority Data

Aug. 31, 2000 (JP) .................................... 2000-263923

(51) Int. Cl.$^7$ .............................. G02B 6/35; G02B 6/28
(52) U.S. Cl. ............................. 385/16; 385/24; 385/32
(58) Field of Search ........................... 385/16–24, 31, 385/32

(56) References Cited

U.S. PATENT DOCUMENTS 6,411,752 B1 * 6/2002 Little et al. ................... 385/17

OTHER PUBLICATIONS

"Self–Latching Waveguide Optical Switch Based on Thermo–Capillarity", ECOC97, 22–25 1997, Conference Publication No. 448, IEE, 1997, pp. 73–76, Makoto Sato et al.
U.S. patent application Ser. No. 09/821,047, filed Mar. 30, 2001, Hideaki Okayama.
Hideaki Okayama, U.S. patent application Ser. No. 09/900, 164, filed Jul. 9, 2001 (specification, claims, abstract and drawings).

* cited by examiner

*Primary Examiner*—Akm Enayet Ullah
*Assistant Examiner*—Michelle R. Connelly-Cushwa
(74) *Attorney, Agent, or Firm*—Wenderoth, Lind & Ponack, L.L.P.

(57) ABSTRACT

This optical switch element comprises mutually intersecting first and second optical waveguides; a cylindrical-shape optical wave-guiding member near the intersecting part; and a heater to control the refractive index of the optical wave-guiding member. Signal light input to a first input port is selectively output from either a first output port or from a second output port. In this optical switch element, the optical wave-guiding member, optical waveguides and cladding are formed such that, when signal light is output from the first output port, the refractive indices of the optical wave-guiding member and cladding are effectively the same.

9 Claims, 9 Drawing Sheets

OPTICAL SWITCH ELEMENT AND WAVELENGTH ROUTER

BACKGROUND OF THE INVENTION

1. Field of the Invention

This invention relates to the field of an optical switch element and a wavelength router.

2. Description of Related Art

Conventionally, optical switches comprise a plurality of switch elements arranged in a matrix, have functions for emission from prescribed output ports of signals which have been input from a plurality of input ports, and are used as modules indispensable for the realization of optical communication systems.

Reference I ("Self-Latching Waveguide Optical Switch Based on Thermo-Capillarity", ECOC97, 22-25 1997, Conference Publication No. 448, IEE, 1997, pp. 73–76) discloses one example of such a switch element. In Reference I, an element is disclosed in which a movable reflecting mirror provided at the intersection of mutually orthogonal bus line waveguides is used, by which means signal light is made to either propagate rectilinearly or to be reflected, so that input light is caused to be output from different output ports.

By means of such an optical switch element, signal light caused to be input from one input port can be made to be output from a selected output port. Hence a plurality of these optical switch elements can be combined to realize a multiple-stage input/output optical switch.

However, the optical switch of Reference I has the following defect. In the optical switch of Reference I, each switch element has a movable reflecting mirror in order to change the optical path of input light, and so losses arising from this occur in each switch element. As a result, the total loss in an optical switch comprising numerous switch elements is extremely large. Specifically, a loss as large as approximately 2 dB occurs at the one mirror of each switch element. One reason for this is the fact that each switch element is extremely small.

That is, reflected light is given as a superpositioning of a plurality of light rays backscattered due to the existence of the scattering object. Consequently, when the object itself becomes approximately as small as the light wavelength, it becomes difficult to obtain adequate reflected light.

Hence in the optical switch element of Reference I, losses in the mirrors provided in optical paths is great, and so when configuring an integrated multiple-stage input/output optical switch, these losses are cumulative, and an extremely large loss occurs. If the losses of each switch element cannot be reduced, it is not possible to realize a low-loss large-scale optical switch adequate for practical use.

SUMMARY OF THE INVENTION

An object of this invention is to provide an optical switch element in which the excess losses at individual optical switch elements can be reduced, so that a low-loss large-scale optical switch adequate for practical use can be configured.

To this end, the optical switch element of this invention is configured as follows. The optical switch element of this invention comprises a substrate; a plurality of optical waveguides (equivalent to a core) on the substrate, surrounded by cladding and mutually intersecting; an optical wave-guiding member, provided in the vicinity of these intersecting parts and capable of optical coupling of each of the optical waveguides; and control means to apply state changes to the optical wave-guiding member in order to control the refractive index. The optical wave-guiding member, each of the optical waveguides, and the cladding are formed such that the refractive index of the optical wave-guiding member is effectively the same as, or higher than, the refractive index of the optical waveguides when in the first state, and is effectively the same as the refractive index of the cladding when in the second state.

In this configuration, when the optical wave-guiding member is in the second state, signal light input to a port equivalent to an end of one optical waveguide of this optical switch element is output from a port equivalent to the other end of the optical waveguide. On the other hand, when the optical wave-guiding member is in the first state, signal light input to an end of one waveguide is transferred to the optical wave-guiding member, which has a refractive index that is effectively the same as or higher than that of the optical waveguide, and then is transferred from the optical wave-guiding member to another optical waveguide. Hence by using control means to control whether the optical wave-guiding member is in the first or the second state, the optical path of signal light input to the optical switch element can be changed, and so operation as an optical switch element can be realized.

This invention also provides a wavelength router by operating the above-mentioned wave-guide member as a ring-type resonator.

The wavelength router of this invention comprises a substrate; a plurality of optical waveguides (equivalent to a core) on the substrate, surrounded by cladding and mutually intersecting; a ring-type resonator, provided in the vicinity of these intersecting parts and capable of optical coupling of each of the optical waveguides; and control means to apply state changes to the optical wave-guiding member in order to control the refractive index. The ring-type resonator, and the cladding are formed such that the refractive index of the optical ring-type resonator is effectively higher than the refractive index of the cladding when in the first state, and is effectively the same as the refractive index of the cladding when in the second state.

In this configuration, suppose that the ring-type resonator is in the first state. In this state, suppose that light is input to a port equivalent to the end of one optical waveguide of the wavelength router. Of this input wavelength-multiplexed light, light at a specific wavelength coinciding with the resonance wavelength of the ring-type resonator, after transfer to the ring-type resonator, is transferred to another optical waveguide, and is output from a port equivalent to an end of the other optical waveguide. The wavelength-multiplexed light with other than the specific wavelength is output from a port equivalent to the other end of the single optical waveguide. On the other hand, suppose the ring-type resonator is in the second state. In this case, wavelength-multiplexed light input to a port equivalent to one end of an optical waveguide is output from the port equivalent to the other end of the optical waveguide. That is, this wavelength router functions as a wavelength router capable of switching between demultiplexing and non-demultiplexing.

BRIEF DESCRIPTION OF THE DRAWINGS

The foregoing and other objects, features and advantages of the present invention will be better understood from the following description taken in connection with accompanying drawings, in which.

DESCRIPTION OF THE PREFERRED EMBODIMENTS

Figure 1:
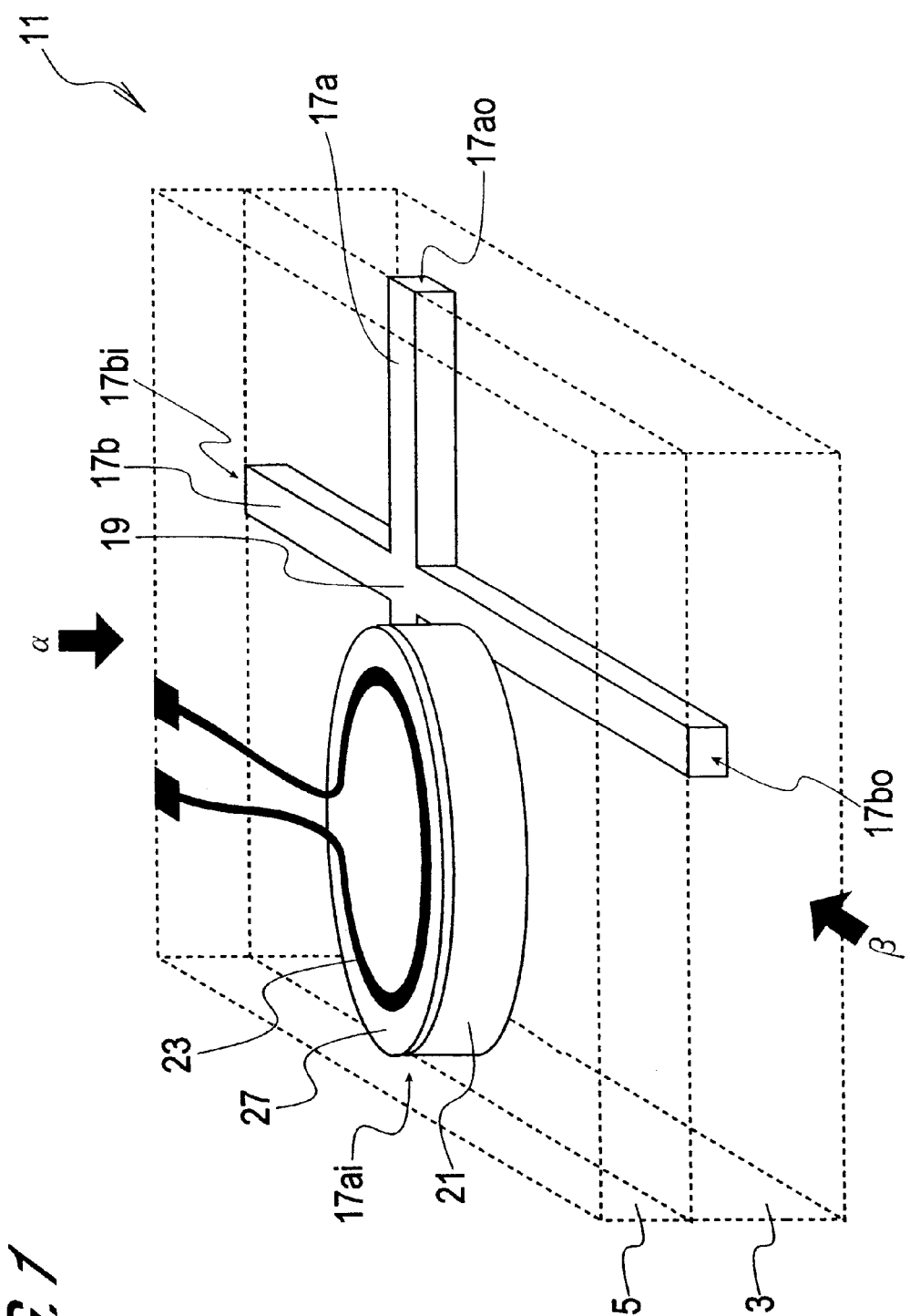
FIG. 1 is a perspective view showing schematically the structure of the optical switch element of a first embodiment.

Below, embodiments of this invention are explained using the drawings. In the drawings, the sizes, shapes and arrangements of components are only shown schematically to enable understanding of this invention; moreover, numerical conditions explained below are merely examples.

First Embodiment

Figure 2:
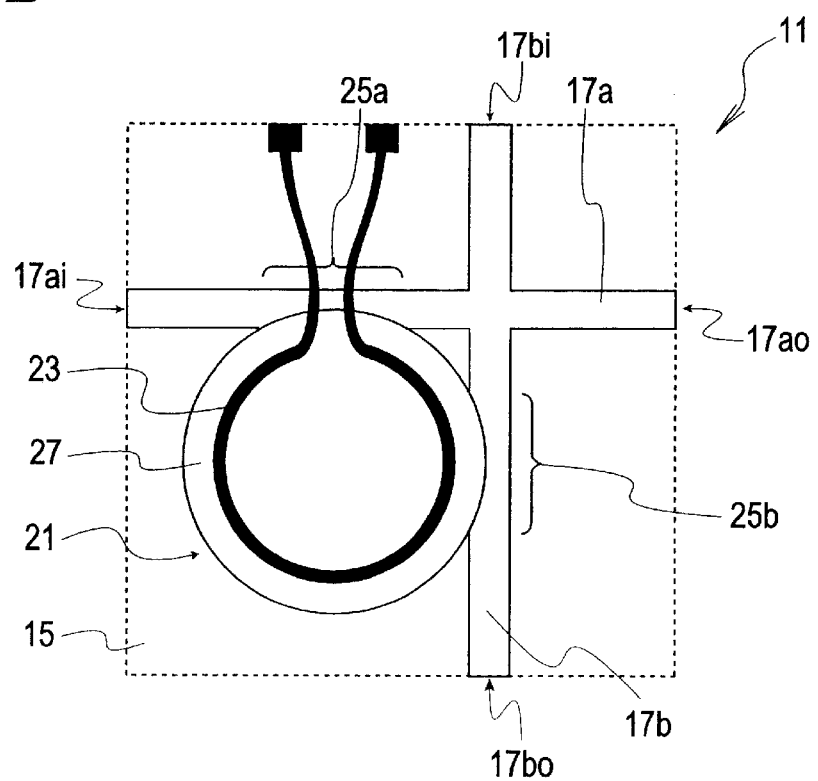
FIG. 2 is a front view of the optical switch element of the first embodiment.
Figure 3:
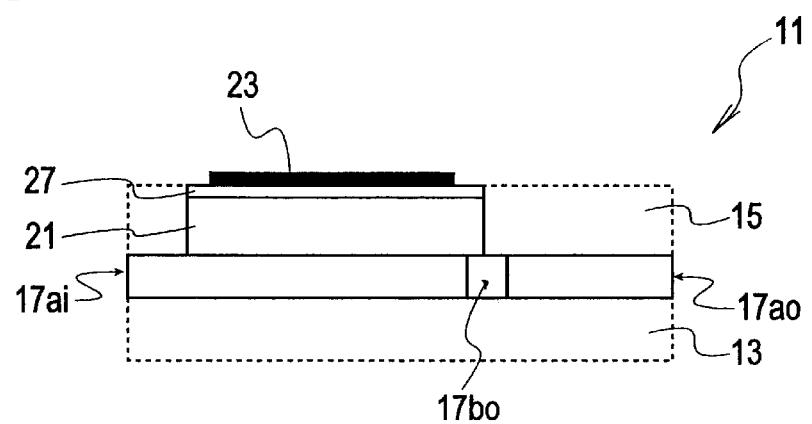
FIG. 3 is a side view of the optical switch element of the first embodiment.

FIG. 1 is a perspective view showing schematically the structure of the optical switch element of a first embodiment of this invention. FIG. 2 and FIG. 3 are front and side views, respectively, of the optical switch element of the first embodiment. FIG. 2 and FIG. 3 are views as seen from the directions of the arrows α and β respectively in FIG. 1. In FIGS. 1 through 3, the substrate and cladding are shown as transparent and indicated by a broken line, to facilitate viewing. First, the configuration of the optical switch element is explained, referring to FIGS. 1 through 3.

The optical switch element 11 of FIG. 1 comprises a substrate 13; a first and second optical waveguide 17a and 17b, on the substrate 13 and surrounded by cladding 15, and mutually intersecting; an optical wave-guiding member 21, provided in the vicinity of the intersection part 19 where the two optical waveguides 17a and 17b intersect, and capable of optically coupling the optical waveguides 17a and 17b; and a heater 23, as control means to change the temperature of the optical wave-guiding member 21 so as to control the refractive index of the wave-guiding member 21. In this configuration example, the linear first and second optical waveguides 17a and 17b are orthogonal.

In particular, this optical switch element 11 is configured such that, of the temperatures which can be assumed, at a first temperature the refractive index of the optical wave-guiding member 21 is effectively equal to or higher than the refractive indices of each of the optical waveguides 17a and 17b (signifying parts equivalent to the cores), and at a second temperature the refractive index of the optical wave-guiding member 21 is effectively equal to the refractive index of the cladding 15. Of course, at both the first and the second temperatures, the refractive indices of each of the optical waveguides 17a and 17b are higher than the refractive index of the cladding 15.

In this optical switch element 11, the refractive index of the optical wave-guiding member 21 at the first temperature is made effectively equal to or higher than the refractive indices of each of the optical waveguides 17a and 17b, with the object of coupling the signal light between each of the optical waveguides 17a and 17b and the optical wave-guiding member 21. In other words, the refractive index of the optical wave-guiding member 21 is a refractive index such that, at the first temperature, power transmission occurs due to optical coupling between this optical wave-guiding member 21 and each of the optical waveguides 17a and 17b. However, in this embodiment, the refractive index of the optical wave-guiding member 21 at the first temperature is set higher than the refractive indices of each of the optical waveguides 17a and 17b.

Here an explanation is given of an embodiment in which, by using a heater 23 as the control means, the thermo-optical effect (TO effect), in which the temperature parameter of the optical wave-guiding member 21 is changed, is utilized to control the refractive index of the optical wave-guiding member 21. However, this invention is not thereby limited, and other effects which change the physical state to enable control of the refractive index, such as for instance an electro-optical effect (EO effect), may be used.

In the example of FIG. 1, the first and second optical waveguides 17a and 17b of this optical switch element 11 are configured as buried-type waveguides embedded in the substrate 13 and cladding 15.

The optical switch element 11 has a first input port 17ai and second input port 17bi to enable input of signal light, and a first output port 17ao and second output port 17bo to enable output of signal light. The first input port 17ai and first output port 17ao are respectively formed at the two ends of the first optical waveguide 17a, and the second input port 17bi and second output port 17bo are formed at the two ends of the second optical waveguide 17b. The second input port 17bi in the figure is a through-port which transmits light rectilinearly to the second output port 17bo.

As shown in FIGS. 1 through 3, the optical wave-guiding member 21 in this embodiment is a cylindrical-shape structure having a face (circular bottom face) which, in particular, is parallel to the plane containing the surfaces of the two optical waveguides 17a and 17b.

As shown in FIGS. 1 through 3, the optical wave-guiding member 21 is provided in a position enabling optical coupling with each of the optical waveguides 17a and 17b, and in particular, as shown by the planar pattern in FIG. 2, in a position such that tangents to the outer perimeter of the optical wave-guiding member 21 approximately coincide with the center lines of the two optical waveguides 17a and 17b. As indicated in FIG. 3, the position in the height direction of the bottom face of the optical wave-guiding member 21 approximately coincides with the positions of the upper faces of each of the optical waveguides 17a and 17b.

The optical wave-guiding member 21 shown in FIGS. 1 through 3 is provided inside cladding 15, and through the cladding 15 adjoins the first and second optical waveguides 17a and 17b, positioned to enable optical coupling with each of the optical waveguides 17a and 17b. For example, the optical coupling region which contributes to actual optical coupling consists of a first optical coupling area 25a at which the first optical waveguide 17a and the optical wave-guiding member 21 are most closely adjacent, and a second optical coupling area 25b at which the second optical waveguide 17b and the optical wave-guiding member 21 are most closely adjacent. Here, suppose that the first and the second optical coupling areas 25a and 25b have the same coupling length L/2, and taking the sum of the two optical coupling areas 25a and 25b, the coupling length is L. If this coupling length is made to coincide with an even multiple of the perfect coupling length for the signal light input to the optical switch element 11, the signal light propagating in the first optical waveguide 17a can be transferred to the second optical waveguide 17b.

The heater 23 comprises electrical heating wire, provided on the upper face of the optical wave-guiding member 21, in order to uniformly heat the cylindrical-shape optical wave-guiding member 21. Though not shown, both ends of the electrical heating wire of the heater 23 are connected to a constant-voltage power supply. In this embodiment, the heater 23 is controlled using two values, on and off, and performs an operation in which the temperature of the optical waveguiding member 21 makes a transition to either room temperature or to a prescribed temperature higher than this, and is maintained at that temperature.

As shown in FIGS. 1 through 3, in the first embodiment a low-refractive index layer 27 is provided between the optical wave-guiding member 21 and the ring-shape heater 23. In order that power transfer of the signal light between the two different optical waveguides 17a and 17b is performed efficiently, it is desirable that the signal light power transferred from the first optical waveguide 17a to the optical wave-guiding member 21 not reach the heater 23 provided on the upper side of the optical wave-guiding member 21. With this object, for example, a low-refractive index layer 27 is provided on the upper face of the optical wave-guiding member 21. By doing so, losses in the optical wave-guiding member 21 can be reduced, and consequently optical losses in the optical switch element 11 can be reduced compared with the case in which no low-refractive index layer 27 is provided.

As shown in FIGS. 1 through 3, thermal conduction occurs between the optical wave-guiding member 21 and each of the adjacent optical waveguides 17a and 17b. That is, when controlling the refractive index of the optical wave-guiding member 21, the heater 23 in this embodiment also changes the temperatures of the optical waveguides 17a and 17b and of the cladding 15. The optical waveguides 17a and 17b and the cladding 15 on the one hand, and the optical wave-guiding member 21 on the other, are formed from materials which exhibit opposite refractive index change characteristics when a temperature change is applied.

As materials which exhibit such refractive index characteristics that change in opposite ways, for example, a combination of organic materials and of materials containing quartz may be used. Many organic materials have characteristics which exhibit monotonic decreases in refractive index. On the other hand, materials containing quartz, though depending on additive materials, are preferable in being able to easily exhibit characteristics which show a monotonic increase in refractive index. Materials containing quartz can exhibit either monotonic increases or monotonic decreases, depending on additive materials.

More specifically, one example of an organic optical polymer material is PMMA (polymethyl methacrylate); one example of a material containing quartz is $SiO_2$ (silicon dioxide). Of course, there is also a dependence on formation conditions; but the temperature coefficients of the refractive index are approximately $\partial n/\partial T = -10^{-4}$ $(K^{-1})$ for PMMA, and $\partial n/\partial T = 7 \times 10^{-6}$ $(K^{-1})$ for $SiO_2$.

In the first embodiment, for example, each of the optical waveguides 17a and 17b and the cladding 15 may be formed from PMMA, and the optical wave-guiding member 21 may be formed from $SiO_2$.

Here, in consideration of the ease with which it is set, room temperature is specifically selected as the second temperature at which the refractive index of the optical wave-guiding member 21 and the refractive index of the cladding 15 coincide. On the other hand, as the first temperature at which the refractive index of the optical wave-guiding member 21 is effectively the same as or higher than the refractive indices of the optical waveguides 17a and 17b, a temperature higher than the second temperature (called the prescribed temperature) is set.

Figure 4:
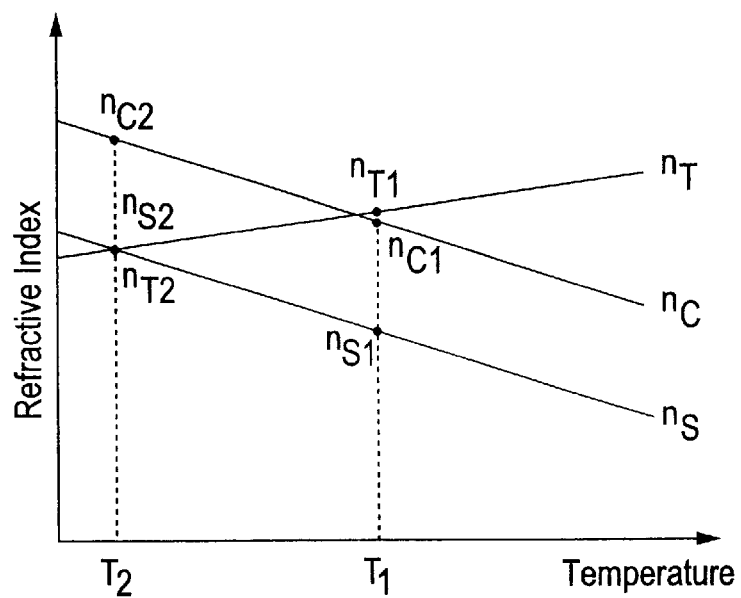
FIG. 4 is a conceptual diagram showing the temperature-refractive index change characteristics of the optical waveguides and cladding, and the temperature-refractive index change characteristics of the optical wave-guiding member, in the first embodiment.

FIG. 4 is a conceptual diagram showing the temperature-refractive index change characteristics of the optical waveguides and cladding, and the temperature-refractive index change characteristics of the optical wave-guiding member, in the first embodiment.

As shown in FIG. 4, as the temperature is raised, the refractive indices of the cladding 15 and of each of the optical waveguides 17a and 17b decrease. That is, the refractive index $n_S$ of the cladding 15 and the refractive index $n_C$ of each of the optical waveguides 17a and 17b decrease monotonically with rising temperature. On the other hand, the refractive index $n_T$ of the optical wave-guiding member 21 increases with rising temperature. These characteristics have a positive or a negative slope with respect to the temperature parameter, and these refractive indices are nearly linearly proportional to the temperature.

As can be understood from FIG. 4, so long as the three characteristics for the change in refractive index of each of the optical waveguides 17a and 17b, of the cladding 15, and of the optical wave-guiding member 21 do not intersect at a single point, the refractive index $n_T$ of the optical wave-guiding member 21 intersects at different temperatures with the two refractive indices $n_S$ and $n_C$ for the cladding 15 and for the optical waveguides 17a, 17b.

In FIG. 4, the refractive indices $n_S$, $n_C$ of the cladding 15 and of the optical waveguides 17a, 17b decrease monotonically. The refractive index $n_{C2}$ at room temperature $T_2$ of the optical waveguides 17a, 17b decreases together with rising temperature (that is, a change from $T_2$ to $T_1$), changing into the refractive index $n_{C1}$ ($n_{C1} < n_{C2}$) of the optical waveguides 17a, 17b at the prescribed temperature $T_1$. The refractive index $n_{S2}$ of the cladding 15 at room temperature $T_2$ decreases together with rising temperature (that is, a change from $T_2$ to $T_1$), and changes into the refractive index $n_{S1}$ ($n_{S1} < n_{S2}$) of the cladding 15 at the prescribed temperature $T_1$.

On the other hand, the refractive index $n_T$ of the optical wave-guiding member 21 increases monotonically. That is, the refractive index $n_{T2}$ of the optical wave-guiding member 21 at room temperature $T_2$ increases together with rising temperature (that is, a change from $T_2$ to $T_1$), and changes into the refractive index $n_{T1}$ ($n_{T1} > n_{T2}$) of the optical wave-guiding member 21 at the prescribed temperature $T_1$.

That is, as shown in FIG. 4, at room temperature ($T_2$: the second temperature), the refractive index $n_{T2}$ of the optical wave-guiding member 21 is equal to the refractive index $n_{S2}$ of the cladding 15 ($n_{S2}=n_{T2}$). At the prescribed temperature $T_1$, the refractive index $n_{T1}$ of the optical wave-guiding member 21 is higher than the refractive index $n_{C1}$ of the optical waveguides 17a, 17b ($n_{T1}>n_{C1}$).

As shown in FIG. 4, it is preferable that the optical waveguides 17a, 17b and the cladding 15 be formed using material and under formation conditions such that similar refractive index change characteristics are exhibited, due to the ability to set a refractive index difference ($n_C-n_S$) which does not depend on temperature.

For example, when using PMMA and $SiO_2$ with the above-described temperature coefficients, the refractive index difference $|n_{C1,C2}-n_{S1,S2}|$ between the optical waveguides 17a, 17b and the cladding 15 at each temperature is essentially constant, as shown in FIG. 4. For example, if a refractive index difference of approximately $5\times10^{-3}$ is supposed, then if the temperature difference between room temperature and the prescribed temperature is changed by approximately 50° C., the refractive indices $n_T$ and $n_S$ are about the same, and if greater changes are made, the relation is reversed. When using such materials to form components, if the radius of the optical wave-guiding member 21 is made larger than approximately 1 mm, for example, losses can be reduced.

In general, organic materials have low temperature resistance, and the range of changeable temperature is at maximum, for example, 100° C. or so. However, by using a material having the opposite refractive index characteristic of above-described organic material for wave-guiding member 21, the range of changeable temperature can be small, and consequently there is no need to consider the temperature resistance of the organic material when designing the optical switch element 11.

Here the operation of the optical switch element 11 of the first embodiment is explained, referring to FIGS. 1 through 3. In this optical switch element 11, by turning on and off the current passed through the heater 23, the temperatures of the optical wave-guiding member 21, the optical waveguides 17a, 17b, and the cladding 15 are changed between two values. These are at room temperature, when no current is passed through the heater 23, and at the prescribed temperature, when a current is passed through the heater 23.

As shown in FIG. 4, when for example no current is passed through the heater 23, that is, at the second temperature $T_2$ (room temperature), the refractive indices $n_{T2}$ and $n_{S2}$ of the optical wave-guiding member 21 and the cladding 15 respectively coincide. In this case, signal light input to the first input port 17ai of the optical switch element 11 propagates through the first optical waveguide 17a and is output from the first output port 17ao, without being effectively influenced by the existence of the second optical waveguide 17b or the optical wave-guiding member 21.

When current is passed through the heater 23, that is, at the first temperature $T_1$ (the prescribed temperature), the refractive index $n_{T1}$ of the optical wave-guiding member 21 is, at least in the vicinity of the intersecting part 19, higher than the refractive indices $n_{S1}$ and $n_{C1}$ of the cladding 15 and of the optical waveguides 17a, 17b respectively. In this case, signal light input to the first input port 17ai of the optical switch element 11 is transferred to the optical wave-guiding member 21, which near the intersecting part 19 has a higher refractive index than the first optical waveguide 17a and second optical waveguide 17b, and then is transferred again from the optical wave-guiding part 21 to the second optical waveguide 17b. Hence in this case, the signal light is output from the second output port 17bo.

In this way, by means of the optical switch element 11 of the first embodiment shown in FIG. 1, signal light input to the first input port 17ai can be made to be output selectively from either the first output port 17ao, or from the second output port 17bo. That is, a single-input two-output type optical switch element can be realized.

The second input port 17bi, which is a through-port, passes signal light to the second output port 17bo regardless of the control state of the heater 23.

As explained above, by means of the optical switch element 11 of the first embodiment, at a prescribed temperature (the first temperature), the refractive index of the optical wave-guiding member 21 is higher than the refractive indices of the optical waveguides 17a, 17b and of the cladding 15, whereas at room temperature (the second temperature), the refractive index of the wave-guiding member 21 is effectively the same as the refractive index of the cladding 15. Consequently, signal light which propagates in the first optical waveguide 17a at room temperature propagates in a uniform refractive index distribution, regardless of the existence of the optical wave-guiding member 21. Hence when the optical path is selected such that the signal light propagates rectilinearly, optical losses in the optical switch element 11 can be reduced, and as a result, when this optical switch element 11 is used to configure a large-scale optical switch using this optical switch element, losses can be greatly reduced. And because this optical switch element has low losses, optical switches can be realized on a larger scale than previously.

In this first embodiment, in particular, a TO effect employing a heater 23 as control means is used to control the refractive index of the optical wave-guiding member 21 and other components, so that simply by applying a slight temperature change, large-range refractive index changes can be achieved. Hence the structure of the control means can be simplified, and consequently an optical switch element 11 can be easily implemented.

In particular, here the optical wave-guiding member 21 is formed from quartz-based material ($SiO_2$), and the optical waveguides 17a, 17b and cladding 15 are formed from organic material (PMMA). In this optical switch element, materials having such opposite refractive index change characteristics are combined, formed and used, so that refractive index changes in order to perform switching can be realized through smaller temperature changes. For this reason, the configuration of the heater 23 of this optical switch element can be simplified and reduced in size, and consequently the optical switch element 21 can be made smaller and less expensive.

The optical wave-guiding member 21, optical waveguides 17a, 17b, and cladding 15 can be formed from arbitrary materials other than those described above; for example, components may be formed from a quartz-based material having different additive materials. In this case also, the optical waveguides 17a, 17b and cladding 15 on one hand, and the optical wave-guiding member 21 on the other hand, can be realized with opposite refractive index change characteristics.

In this first embodiment, as explained above, the first and second optical waveguides 17a, 17b are positioned so as to be mutually orthogonal. Hence leaks from one waveguide to the other waveguide can be made small, and so losses in the optical switch element can be reduced. This is also preferable in that the element can be made small.

Here, an example using two optical waveguides 17a, 17b has been explained; but a plurality of three or more optical waveguides can be used, performing temperature changes at three or more temperature values, to configure an optical switch element.

The optical wave-guiding member 21 described in the first embodiment has a cylindrical construction; however, implementation of this optical switch element of this invention is not limited to this shape, and an optical wave-guiding member of any arbitrary shape capable of passing light between waveguides can be used. In this embodiment, the optical wave-guiding member 21 is provided above the optical waveguides 17a, 17b; but the optical wave-guiding member 21 and the optical waveguides 17a, 17b may also be positioned with side faces mutually adjacent.

Second Embodiment

Figure 5:
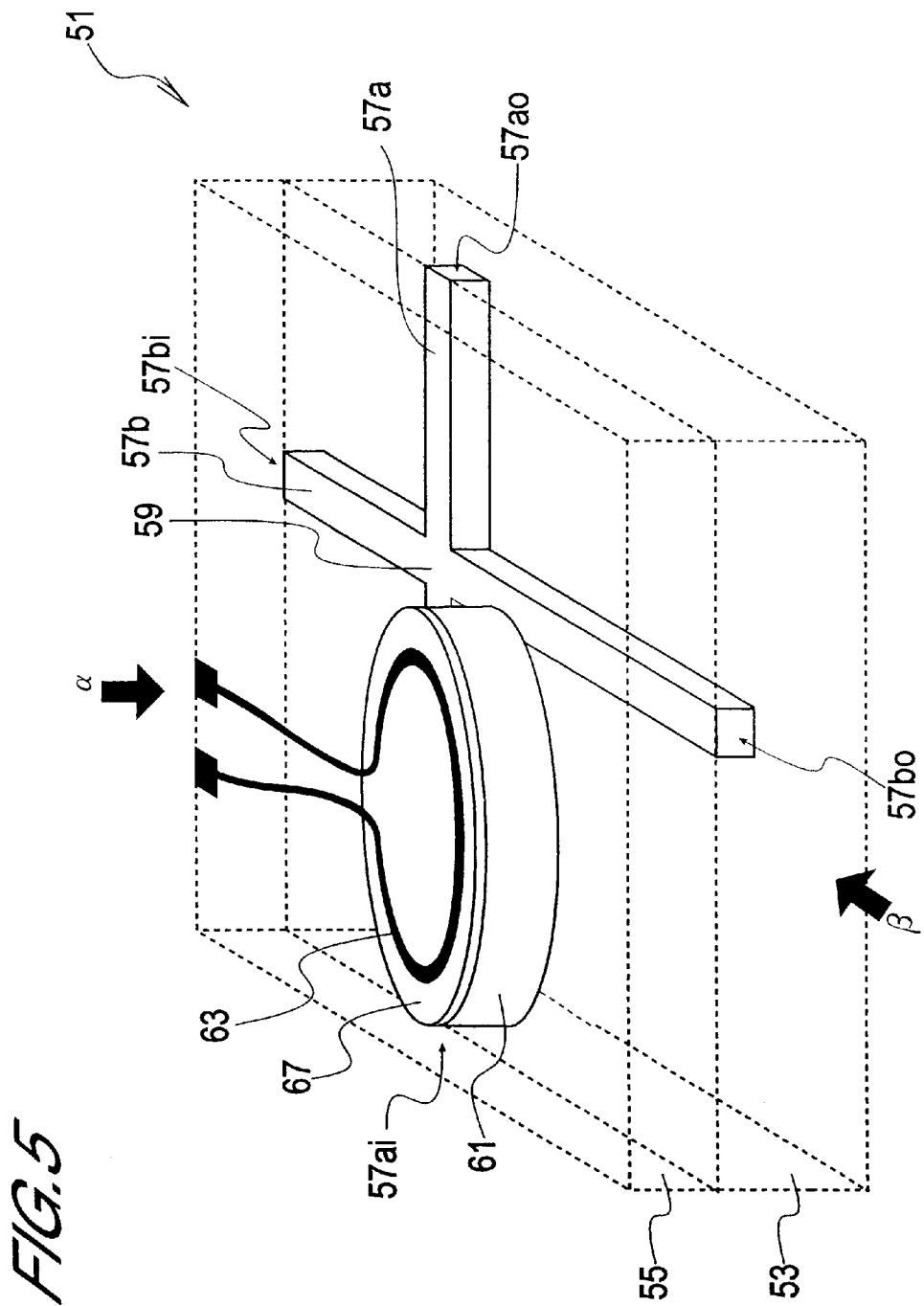
FIG. 5 is a perspective view showing schematically the structure of the wavelength router of a second embodiment.
Figure 6:
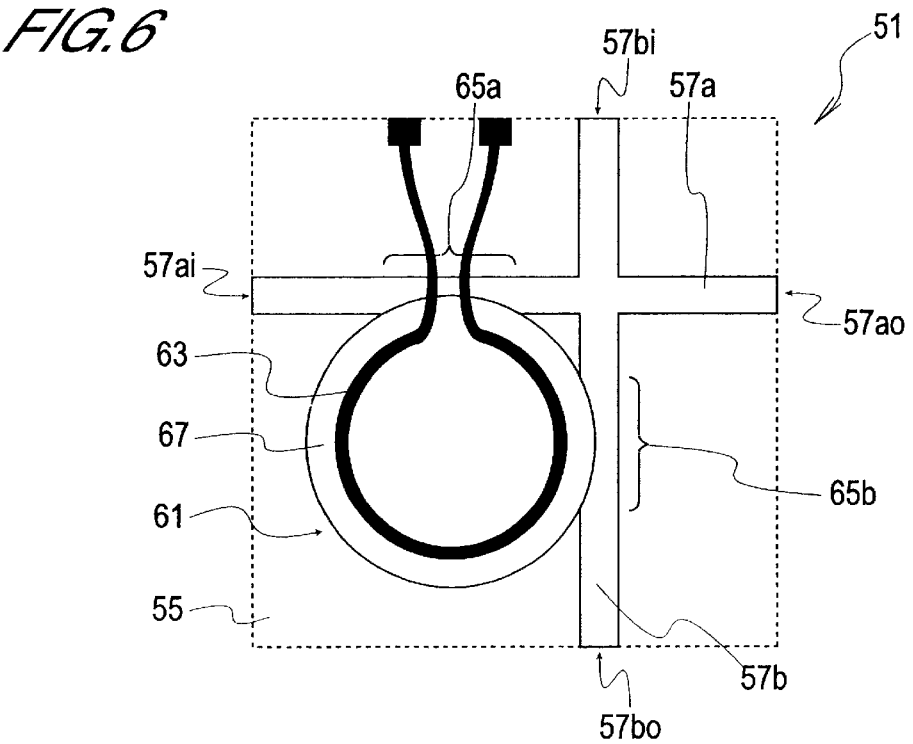
FIG. 6 is a front view of the wavelength router of the second embodiment.
Figure 7:
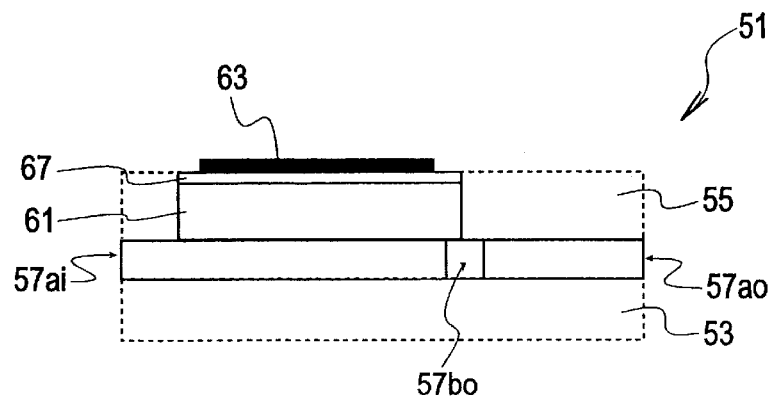
FIG. 7 is a side view of the wavelength router of the second embodiment.

FIG. 5 is a perspective view showing schematically the structure of the wavelength router of a second embodiment. FIG. 6 and FIG. 7 are front and side views respectively of the wavelength router of the second embodiment. FIG. 6 and FIG. 7 are views as seen from the directions of the arrows α and β respectively in FIG. 5. In FIGS. 5 through 7, the substrate and cladding are shown as transparent and indicated by a broken line, to facilitate viewing. First, the configuration of the wavelength router is explained, referring to FIGS. 5 to 7. FIGS. 5 to 7 correspond to FIGS. 1 to 3 respectively, and except for the replacement of the optical wave-guiding member by a ring-type resonator, have nearly the same components.

As shown in FIG. 5, the wavelength router 51 comprises a substrate 53; a first and a second optical waveguide 57a and 57b on the substrate 53, surrounded by cladding 55, and which intersect, for example orthogonally; a ring-type resonator 61, provided in the vicinity of the intersecting part 59 at which these two optical waveguides 57a and 57b intersect, and which is capable of optical coupling with these optical waveguides 57a, 57b; and a heater 63 as control means to change the temperature of the ring-type resonator 61 so as to control the refractive index of the ring-type resonator 61. In this case also, the first and second optical waveguides 57a, 57b are linear waveguides.

In particular, this wavelength router 51 is configured such that, of the temperatures which can be assumed, at a first temperature the refractive index of the ring-type resonator 61 is higher than the refractive index of the cladding 55, and at a second temperature the refractive index of the ring-type resonator 61 is effectively the same as the refractive index of the cladding 55. Here, it is sufficient to achieve optical coupling between the ring-type resonator 61 and the optical waveguides 57a, 57b, so that in contrast with the case of the optical switch element of the first embodiment, there is no particular need to take into consideration the relative value of the refractive indices of the optical waveguides 57a, 57b and of the ring-type resonator 61.

Here, an embodiment is explained in which, by using a heater 63 as the control means, the TO effect is utilized to change the temperature parameter of the ring-type resonator 61, and the refractive index of the ring-type resonator 61 is controlled. However, the present invention is not limited to this, and similarly to the explanation of the first embodiment, and other effects which change the physical state to enable control of the refractive index, such as for instance an electro-optical effect (EO effect), may be used.

In the example of FIG. 5, the first and second waveguides 57a, 57b of this wavelength router 51 are configured as buried-type waveguides covered by the substrate 53 and cladding 55.

The wavelength router 51 has a first input port 57ai into which signal light which has been wavelength-multiplexed (called wavelength-multiplexed light) is input, a first output port 57ao from which, in the demultiplexing state, wavelength-multiplexed light other than a specific wavelength is output, and a second output port 57bo from which, in the demultiplexing state, only light at the specific wavelength from the wavelength-multiplexed light is output. The first input port 57ai and the first output port 57ao are formed by the two ends of the first optical waveguide 57a, and the second input port 57bi and second output port 57bo are formed by the two ends of the second optical waveguide 57b. The second input port 57bi in the figure is a through-port which transmits light rectilinearly to the second output port 57bo.

As shown in FIGS. 5 through 7, the ring-type resonator 61 in this embodiment is a cylindrical-shape structure having a face (circular bottom face) which, in particular, is parallel to the plane containing the surfaces of the two optical waveguides 57a and 57b.

As shown in FIGS. 5 through 7, the ring-type resonator 61 is provided in a position enabling optical coupling with each of the optical waveguides 57a and 57b, and in particular, as shown by the planar pattern in FIG. 6, in a position such that tangents to the outer perimeter of the ring-type resonator 61 approximately coincide with the center lines of the two optical waveguides 57a and 57b. As indicated in FIG. 7, the position in the height direction of the bottom face of the ring-type resonator 61 approximately coincides with the positions of the upper faces of each of the optical waveguides 57a and 57b.

The ring-type resonator 61 shown in FIGS. 5 through 7 is provided inside cladding 55, and through the cladding 55 adjoins the first and second optical waveguides 57a and 57b, positioned to enable optical coupling with each of the optical waveguides 57a and 57b. Here, the optical coupling region which contributes to actual optical coupling consists of a first optical coupling area 65a at which the first optical waveguide 57a and the ring-type resonator 61 are most closely adjacent, and a second optical coupling area 65b at which the second optical waveguide 57b and the ring-type resonator 61 are most closely adjacent. Here, suppose that the first and the second optical coupling areas 65a and 65b have the same coupling length L/2, and taking the sum of the two optical coupling areas 65a and 65b, the coupling length is L. If this coupling length is made to coincide with an even multiple of the perfect coupling length of the wavelength-multiplexed light propagating in the first optical waveguide 57a, it is possible to transfer only light at a specific wavelength to the second optical waveguide 57b.

In this way, in place of the optical wave-guiding member described in the first embodiment, a ring-type resonator 61 is used. As is widely known, a ring-type resonator 61 is able to propagate only light at a specific wavelength, within wavelength-multiplexed light, coinciding with the resonance wavelength of the ring-type resonator 61. Hence in contrast with the first embodiment, only light at a specific wavelength is transferred from the first optical waveguide 57a to the ring-type resonator 61, and is then transferred to the second optical waveguide 57b.

Through the functions of such a ring-type resonator 61, this wavelength router 51 does not operate as an optical switch element like that explained in the first embodiment. This wavelength router 51 can be switched between demultiplexing and non-demultiplexing; in the demultiplexing state, the router can be made to operate as a wavelength router which outputs light at a specific wavelength and all other wavelength-multiplexed light from different ports.

In the wavelength router 51 of the second embodiment, as indicated below, the ring-type resonator 61 can be controlled at a first temperature, a second temperature, or at other temperatures by means of a heater 63, and by this means the resonance wavelength can be changed. Hence this wavelength router 51 can be made to operate as a wavelength router with a variable selected wavelength.

The heater 63 comprises electrical heating wire, provided on the upper face of the ring-type resonator 61, in order to uniformly heat the ring-type resonator 61. Though not shown, both ends of the electrical heating wire of the heater 63 are connected to a constant-voltage power supply. In this embodiment, the heater 63 is controlled using two values, on and off, and performs an operation in which the temperature of the ring-type resonator 61 makes a transition to either room temperature or to a prescribed temperature higher than this, and is maintained at that temperature.

As shown in FIGS. 5 through 7, in the second embodiment a low-refractive index layer 67 is provided between the ring-type resonator 61 and the ring-shape heater 63. In order that power transfer of light at a specific wavelength is performed efficiently between the two different optical waveguides 57a and 57b, it is desirable that the light at a specific wavelength which is power-transferred from the first optical waveguide 57a to the ring-type resonator 61 not reach the heater 63 provided on the upper side of the ring-type resonator 61. With this object, for example, a low-refractive index layer 67 is provided on the upper face of the ring-type resonator 61. By doing so, losses in the optical wave-guiding member 61 can be reduced, and consequently optical losses in the wavelength router 51 can be reduced compared with the case in which no low-refractive index layer 67 is provided.

As shown in FIGS. 5 through 7, thermal conduction occurs between the ring-type resonator 61 and each of the adjacent optical waveguides 57a and 57b. That is, when controlling the refractive index of the ring-type resonator 61, the heater 63 in this embodiment also changes the temperatures of the optical waveguides 57a and 57b and of the cladding 55. The optical waveguides 57a and 57b and the cladding 55 on the one hand, and the ring-type resonator 61 on the other, are formed from materials which exhibit opposite refractive index change characteristics when a temperature change is applied.

As materials which exhibit such refractive index characteristics which change in opposite ways, for example, a combination of organic materials and of materials containing quartz may be used. Many organic materials have characteristics which exhibit monotonic decreases in refractive index. On the other hand, materials containing quartz, though depending on additive materials, are preferable in being able to easily exhibit characteristics which show a monotonic increase in refractive index.

In the second embodiment, for example, similarly to the first embodiment, each of the optical waveguides 57a and 57b and the cladding 55 may be formed from PMMA, and the ring-type resonator 61 may be formed from $SiO_2$.

Here, in consideration of the ease with which it is set, room temperature is specifically selected as the second temperature at which the refractive index of the ring-type resonator 61 and the refractive index of the cladding 55 coincide. On the other hand, as the first temperature at which the refractive index of the ring-type resonator 61 is higher than the refractive index of the cladding 55, a temperature higher than this (called the prescribed temperature) is set.

Figure 8:
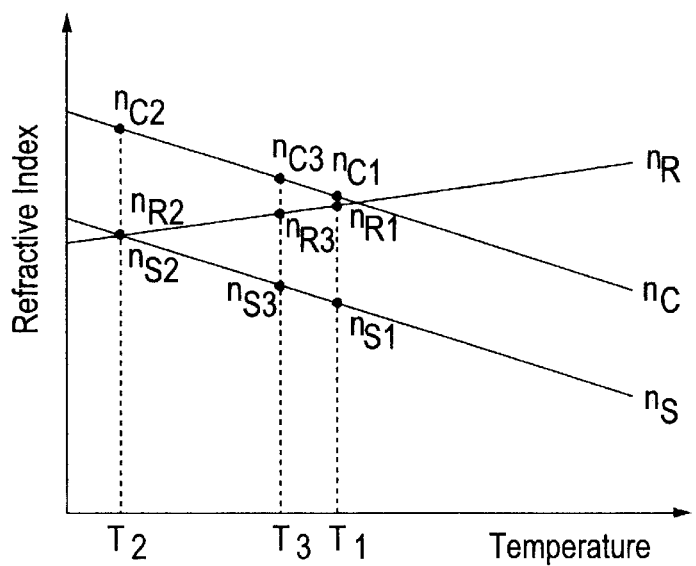
FIG. 8 is a conceptual diagram showing the temperature-refractive index change characteristics of the optical waveguides and cladding, and the temperature-refractive index change characteristics of the ring-type resonator, in the second embodiment.

FIG. 8 is a conceptual diagram showing the temperature-refractive index change characteristics of the optical waveguides and cladding, and the temperature-refractive index change characteristics of the ring-type resonator, in the second embodiment.

As shown in FIG. 8, as the temperature is raised, the refractive indices of the cladding 55 and of each of the optical waveguides 57a and 57b decrease. That is, the refractive index $n_S$ of the cladding 55 and the refractive index $n_C$ of each of the optical waveguides 57a and 57b decrease monotonically with rising temperature. On the other hand, the refractive index $n_R$ of the ring-type resonator 61 increases with rising temperature. These characteristics have a positive or a negative slope with respect to the temperature parameter, and these refractive indices are nearly linearly proportional to the temperature.

As can be understood from FIG. 8, so long as the three characteristics for the change in refractive index of each of the optical waveguides 57a and 57b, of the cladding 55, and of the ring-type resonator 61 do not intersect at a single point, the refractive index $n_R$ of the ring-type resonator 61 intersects at different temperatures with the two refractive indices $n_S$ and $n_C$ for the cladding 55 and for the optical waveguides 57a, 57b.

In FIG. 8, the refractive indices $n_S$, $n_C$ of the cladding 55 and of the optical waveguides 57a, 57b decrease monotonically. The refractive index $n_{C2}$ at room temperature $T_2$ of the optical waveguides 57a, 57b decreases together with rising temperature (that is, a change from $T_2$ to $T_1$), changing into the refractive index $n_{C1}$ ($n_{C1}<n_{C2}$) of the optical waveguides 57a, 57b at the prescribed temperature $T_1$. The refractive index $n_{S2}$ of the cladding 55 at room temperature $T_2$ decreases together with rising temperature (that is, a change from $T_2$ to $T_1$), and changes into the refractive index $n_{S1}$ ($n_{S1}<n_{S2}$) of the cladding 55 at the prescribed temperature $T_1$.

On the other hand, the refractive index $n_R$ of the ring-type resonator 61 increases monotonically. That is, the refractive index $n_{R2}$ of the ring-type resonator 61 at room temperature $T_2$ increases together with rising temperature (that is, a change from $T_2$ to $T_1$), and changes into the refractive index $n_{R1}$ ($n_{R1}>n_{R2}$) of the ring-type resonator 61 at the prescribed temperature $T_1$.

That is, as shown in FIG. 8, at room temperature ($T_2$: the second temperature), the refractive index $n_{R2}$ of the ring-type resonator 61 is equal to the refractive index $n_{S2}$ of the cladding 55 ($n_{R2}=n_{S2}$). At the prescribed temperature $T_1$, the refractive index $n_{R1}$ of the ring-type resonator 61 is higher than the refractive index of the cladding 55, and is approximately equal to the refractive index $n_{C1}$ of the optical waveguides 57a, 57b ($n_{R1}\approx n_{C1}>n_{S1}$).

As shown in FIG. 8, it is preferable that the optical waveguides 57a, 57b and the cladding 55 be formed using material and under formation conditions such that similar refractive index change characteristics are exhibited, due to the ability to set a refractive index difference ($n_C-n_S$) which does not depend on temperature.

For example, when using PMMA and $SiO_2$ with the above-described temperature coefficients, the refractive index difference $|n_{C1,C2}-n_{S1,S2}|$ between the optical waveguides 57a, 57b and the cladding 55 at each temperature is essentially constant, as shown in FIG. 8. For example, if a refractive index difference of approximately $5\times10^{-3}$ is supposed, then if the temperature difference between room temperature and the prescribed temperature is changed by approximately 50° C., the refractive indices $n_T$ and ns are about the same. When using such materials to form components, if the radius of the ring-type resonator 61 is made larger than approximately 1 mm, for example, optical losses can be reduced.

In general, organic materials have low temperature resistance, and the range of changeable temperature is at maximum, for example, 100° C. or so. However, by using a material having the opposite refractive index characteristic of above-described organic material for ring-type resonator 61, the range of changeable temperature can be small, and consequently there is no need to consider the temperature resistance of the organic material when designing the wavelength router 51.

Here the operation of the wavelength router 51 of the second embodiment is explained, referring to FIGS. 5 through 7. In this wavelength router 51, by turning on and off the current passed through the heater 63, the temperatures of the ring-type resonator 61, the optical waveguides 57a, 57b, and the cladding 55 are changed between two values. These are at room temperature, when no current is passed through the heater 63, and at the prescribed temperature, when a current is passed through the heater 63.

As shown in FIG. 8, when for example no current is passed through the heater 63, that is, at the second temperature $T_2$ (room temperature), the refractive indices $n_{R2}$ and $n_{S2}$ of the ring-type resonator 61 and the cladding 55 respectively coincide. In this case, because the wavelength router 51 is in the non-demultiplexing state, wavelength-multiplexed light input to the first input port 57ai of the wavelength router 51 propagates through the first optical waveguide 57a and is output from the first output port 57ao, without being effectively influenced by the existence of the second optical waveguide 57b or the ring-type resonator 61.

When current is passed through the heater 63, that is, at the first temperature $T_1$ (the prescribed temperature), the refractive index $n_{R1}$ of the ring-type resonator 61 is, at least in the vicinity of the intersecting part 59, higher than the refractive index $n_{S1}$ of the cladding 55, and is approximately equal to the refractive index $n_{C1}$ of the optical waveguides 57a, 57b. In this case, because the wavelength router 51 is in the demultiplexing state, of the wavelength-multiplexed light input to the first input port 57ai of the wavelength router 51, light at a specific wavelength is transferred to the ring-type resonator 61 near the intersecting part 59, and then is transferred from the ring-type resonator 61 to the second optical waveguide 57b. Hence in this case, light of the specific wavelength is output from the second output port 57bo.

In this way, by means of the wavelength router 51 of the second embodiment shown in FIG. 5, switching between a demultiplexing state and a non-demultiplexing state is possible; in the demultiplexing state, of the wavelength-multiplexed light input to the first input port 57ai, light of a specific wavelength can be output from the second output port 57bo, and the wavelength-multiplexed light other than this specific wavelength can be output from the first output port 57ao.

For example, by controlling the temperature of the ring-type resonator 61 such that the temperature is a third temperature $T_3$, different from the first and second temperatures $T_1$ and $T_2$, the specific wavelength for demultiplexing can be freely changed. However, this third temperature $T_3$ is a temperature at which the refractive index $n_{R3}$ of the ring-type resonator 61 is higher than the refractive index $n_{S3}$ of the cladding 55, and also different from the refractive index $n_{R1}$ of the ring-type resonator 61 at the first temperature (the prescribed temperature), as shown in FIG. 8. By this means, two demultiplexing conditions can be realized.

That is, because the refractive index of the ring-type resonator 61 can be made to assume different values at the first and third temperatures, the resonance wavelength of the ring-type resonator 61 can be varied, and so a wavelength router with a variable demultiplexing wavelength can be realized. Here $n_{C3}$ is the refractive index of the first and second optical wavelengths at this third temperature $T_3$ ($n_{C3} > n_{R3} > n_{S3}$).

The second input port 57bi, which is a through-port, passes signal light (wavelength-multiplexed light) to the second output port 57bo regardless of the control state of the heater 63.

As explained above, by means of the wavelength router 51 of the second embodiment, at a prescribed temperature (the first temperature), the refractive index of the ring-type resonator 61 is higher than the refractive index of the cladding 55 and approximately equal to the refractive index of the optical waveguides 57a, 57b, whereas at room temperature (the second temperature), the refractive index of the ring-type resonator 61 is effectively the same as the refractive index of the cladding 55. Consequently, wavelength-multiplexed light which propagates in the first optical waveguide 57a at room temperature propagates in a uniform refractive index distribution, regardless of the existence of the ring-type resonator 61. Hence when the optical path is selected such that the wavelength-multiplexed light propagates rectilinearly, optical losses in the wavelength router 51 can be reduced, and as a result, when for example a large-scale add/drop circuit is configured to multiplex and demultiplex numerous light signals at specific wavelengths, losses can be greatly reduced. And because this optical switch element has low losses, add/drop circuits can be realized on a larger scale than previously.

In this second embodiment, in particular, a TO effect employing a heater 63 as control means is used to control the refractive index of the ring-type resonator 61 and other components, so that simply by applying a slight temperature change, large-range refractive index changes can be achieved. Hence the structure of the control means can be simplified, and consequently a wavelength router 51 can be easily implemented.

In particular, here the ring-type resonator 61 is formed from quartz-based material ($SiO_2$), and the optical waveguides 57a, 57b and cladding 55 are formed from organic material (PMMA). In this optical switch element, materials having such opposite refractive index change characteristics are combined and formed, so that refractive index changes in order to switch between demultiplexing and non-demultiplexing and to perform wavelength selection can be realized through smaller temperature changes. For this reason, the configuration of the heater 63 of this wavelength router can be simplified and reduced in size, and consequently the wavelength router 51 can be made smaller and less expensive.

The ring-type resonator 61, optical waveguides 57a, 57b, and cladding 55 can be formed from arbitrary materials other than those described above; for example, components may be formed from a quartz-based material having different additive materials. In this case also, the optical waveguides 57a, 57b and cladding 55 on one hand, and the ring-type resonator 61 on the other hand, can be realized with opposite refractive index change characteristics.

In this second embodiment, as explained above, the first and second optical waveguides 57a, 57b are positioned so as to be mutually orthogonal. Hence leaks from one waveguide to the other waveguide can be made small, and so losses in the wavelength router 51 can be reduced. This is also preferable in that the element can be made small.

Here, an example using two optical waveguides 57a, 57b has been explained; but a plurality of three or more optical waveguides can be used, performing temperature changes at three or more temperature values, to configure a wavelength router. In such a case, a wavelength router is realized in which demultiplexing wavelengths can be varied.

In the second embodiment, the ring-type resonator 61 is provided above the optical waveguides 57a, 57b; but the ring-type resonator 61 and the optical waveguides 57a, 57b may also be positioned with side faces mutually adjacent.

Simulation Results

Here the results of simulations using the FDTD (Finite Difference Time Domain) method and BPM (Beam Propagation Method) for the above-described optical switch element and wavelength router are described. In the following simulations, the explanation is mainly of input to an optical switch element of signal light; but this is essentially the same as input of only light of a specific wavelength to a wavelength router.

FDTD Method

Figure 9A:
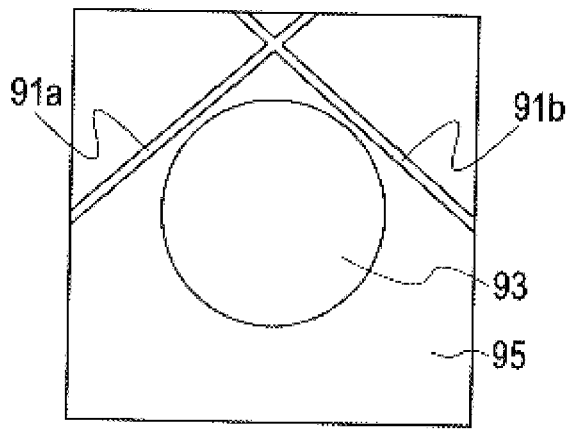
FIG. 9 is a drawing which explains the results of FDTD method simulations.
Figure 9B:
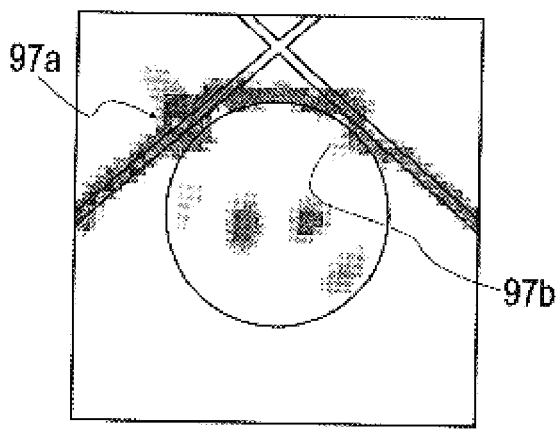
Figure 9C:
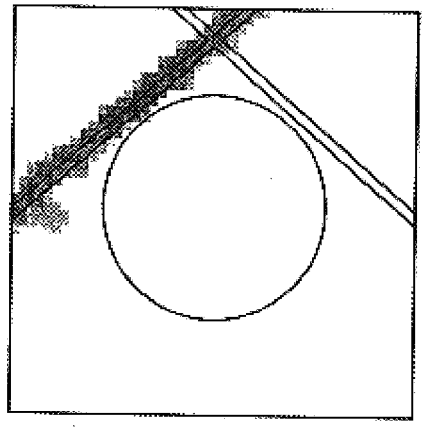

FIG. 9 is a drawing for use in explaining the results of simulations using the FDTD method. FIG. 9(A) shows the layout in a planar pattern of the cylindrical-shape optical wave-guiding member and two orthogonal linear waveguides in the optical switch element (however, the heater or other control means is omitted). FIG. 9(B) shows the optical path with the optical switch element in the first state (the optical path for the case in which there is transfer from the first linear waveguide to the second linear waveguide). FIG. 9(C) shows the optical path with the optical switch element in the second state (the optical path for the case in which light propagates through the first linear waveguide). In each of the drawings, the blackened areas correspond to the optical path.

In the FDTD method, calculations of the Maxwell equations are performed with time and space partitioned into a plurality of lattice-shapes; in order to simplify the calculations, however, the area is restricted. That is, parameters are set to extreme values, as follows:

Width of the two linear waveguides 91a, 91b: 1 $\mu$m

Intersection angle of the two linear waveguides 91a, 91b: 90°

Diameter of the cylindrical-shape optical wave-guiding member 93: 6 $\mu$m

Refractive index of the linear waveguides 91a, 91b: 3

Refractive index of the cylindrical-shape optical wave-guiding member 93: 3

Refractive index of the cladding 95: 1

As shown in FIG. 9(B), in the first state the optical path of the signal light (the bold line in the figure) is a path which, at the part 97a of the first linear waveguide 91a which is most closely adjacent to the cylindrical-shape optical wave-guiding member 93, transfers from the first linear waveguide 91a to the cylindrical-shape optical wave-guiding member 93. Then, the signal light, after being transferred to the cylindrical-shape optical wave-guiding member 93, propagates along a path which transfers from the cylindrical-shape optical wave-guiding member 93 to the second linear waveguide 91b at the part 97b of the second linear waveguide 91b which is most closely adjacent to the cylindrical-shape optical wave-guiding member 93.

On the other hand, as shown in FIG. 9(C), the optical path of the signal light in the second state (the bold line in the figure) is the path of propagation along the first linear waveguide 91a.

As shown by these simulation results, it can be understood that by means of this optical switch element, transfer of signal light between two orthogonal linear waveguides 91a and 91b, via a cylindrical-shape optical wave-guiding member 93, is possible.

BPM Method

Figure 10:
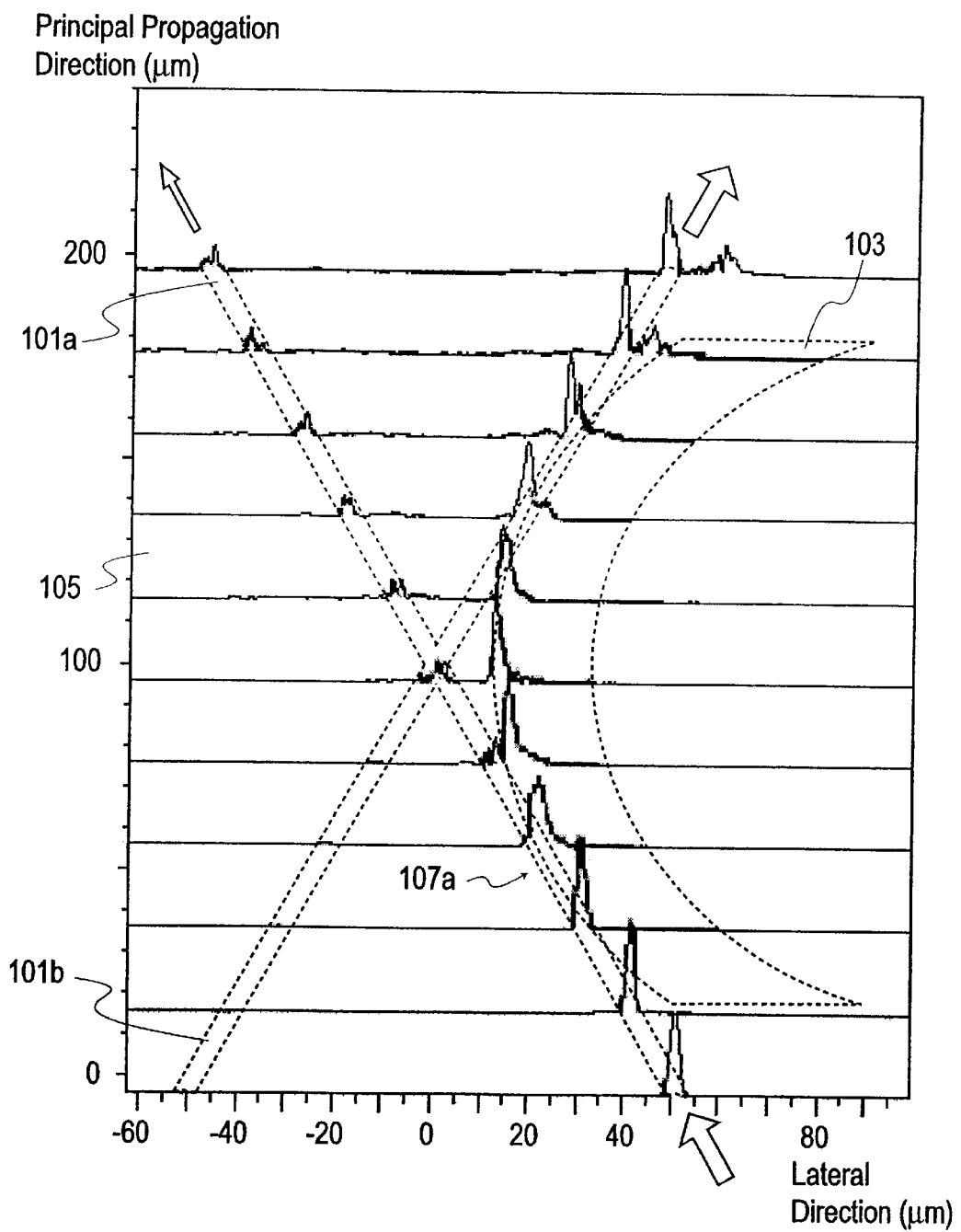
FIG. 10 is a drawing showing optical path simulation results with the optical switch element in the first state, based on the BPM method; and, FIG. 11 is a drawing showing propagation losses with the optical switch element in the second state, versus the difference dd in refractive indices of the cylindrical-shape optical wave-guiding member and cladding, calculated using the BPM method.
Figure 11:
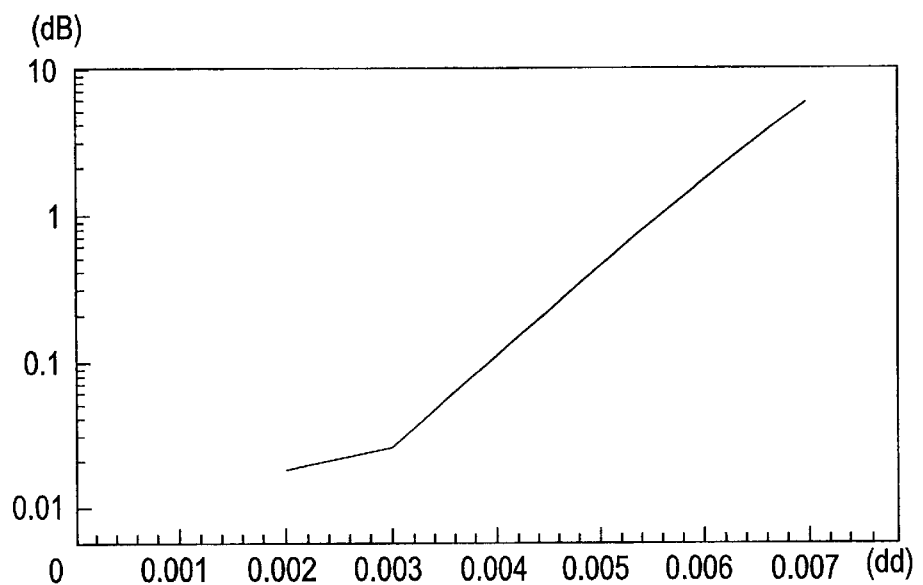

FIG. 10 is a diagram showing simulation results for the optical path with the optical switch element in the first state (the optical path for the case of transfer from the first linear waveguide to the second linear waveguide), calculated based on the BPM method. The broken line in FIG. 10 shows the planar pattern of the optical wave-guiding member and two linear waveguides, and the thick arrows show the direction of input and output of the signal light. FIG. 11 is a diagram showing the propagation loss of the optical switch element in the second state, when the refractive index difference dd between the cylindrical optical wave-guiding member and the cladding is varied, as calculated based on the BPM method.

In the BPM method, when the angle of intersection of linear waveguides becomes as large as 90° or so, rigorous calculations are no longer possible, and so the angle of intersection of the two is made comparatively small. That is, here parameters were set such that:

Width of the two linear waveguides 101a, 101b: 6 $\mu$m

Intersection angle of the two linear waveguides 101a, 101b: 60°

Diameter of the cylindrical-shape optical wave-guiding member 103: 200 $\mu$m

Refractive index difference between linear waveguides 101a, 101b and cladding 105: 0.01

As shown in FIG. 10, on the optical path of signal light in the first state (the light-wave distribution in the figure), mode coupling occurs between the first and second linear waveguides 101a, 101b and the cylindrical-shape optical wave-guiding member 103, so that the peak in the light-wave waveform is transferred, in the vicinity of the part 107a of the first linear waveguide 101a which is most closely adjacent to the cylindrical-shape optical wave-guiding member 103, from the first linear waveguide 101a to the optical wave-guiding member 103.

As can be understood from FIG. 10, even when the intersecting angle is approximately 60°, signal light of sufficient intensity can be transferred from the first linear waveguide 101a to the second linear waveguide 101b.

As shown in FIG. 11, the propagation loss in the second state increases monotonically when the refractive index difference dd between the cylindrical-shape optical wave-guiding member 103 and the cladding 105 is between 0.002 and 0.007. That is, when for example dd is near 0, the signal light propagating in the first linear waveguide 101a propagates without modification, without being scattered as a result of a refractive index difference with the optical wave-guiding member 103; hence the propagation loss is small, and for example when dd=0.002, the propagation loss L is approximately 0.01 dB. When for example dd is near 0.01 (=refractive index difference between the linear waveguide and cladding), of the signal light propagating in the first linear waveguide 101a, the proportion of signal light transferred to the optical wave-guiding member 103 increases, so that the intensity of the signal light propagating without modification in the first linear waveguide 101a is relatively small; for example, when dd=0.007, the propagation loss is approximately 6 dB.

As shown in FIG. 11, it is thought that in the range dd<0.003, the propagation loss in the second state in particular can be effectively reduced.

As can be understood from the above-described simulation results, by means of the optical switch element of this application, propagation losses can be reduced. For example, 64×64 optical switch elements can be incorporated within 15 cm², and the overall loss as optical switch elements can be held to within 10 dB.

What is claimed is:

1. An optical switch element comprising:

a substrate;

a plurality of optical waveguides, which mutually intersect at an intersecting part of the waveguides, said optical waveguides being located on said substrate;

cladding adjacent to said optical waveguides;

an optical wave-guiding member, located near the intersecting part of the optical waveguides, capable of coupling said optical waveguides;

a control portion, located above said optical wave-guiding member, operable to effect a state change of said optical wave-guiding member at least between a first state and a second state so as to control the refractive index of said optical wave-guiding member; and a layer having a refractive index lower than the refractive index of said optical wave-guiding member, located between said optical wave-guiding member and said control portion;

wherein said optical wave-guiding member, said optical waveguides, and said cladding are formed such that: the refractive index of said optical wave-guiding member in the first state is effectively equal to or greater than the refractive index of said optical waveguides; and the refractive index of said optical wave-guiding member in the second state is effectively equal to the refractive index of said cladding;

wherein: said control portion is further operable to apply the state change to said optical waveguides and said cladding; said optical waveguides and said optical wave-guiding member are formed from respective materials that exhibit opposite refractive index change characteristics from one another when the state change is effected; and said cladding and said optical wave-guiding member are formed from respective materials that exhibit opposite refractive index change characteristics from one another when the state change is effected; and wherein said plurality of optical waveguides and said cladding are formed using material and under formation conditions such that the optical waveguides and the cladding exhibit similar refractive index change characteristics and the refractive index characteristics of the optical waveguides and the cladding have a difference that does not depend on temperature, such that the refractive indexes of the optical waveguides, the cladding, and the optical wave-guiding member are not the same at any state.

2. The optical switch element according to claim 1, wherein said optical waveguides and said cladding are formed from organic materials, and said optical wave-guiding member is formed from material containing quartz.

3. The optical switch element according to claim 2, wherein said control portion is a heater, provided above said layer having a refractive index lower than the refractive index of said optical wave-guiding member, operable to uniformly heat said optical wave-guiding member to effect a change in temperature as the state change.

4. The optical switch element according to claim 1, wherein said control portion is a heater, provided above said layer having a refractive index lower than the refractive index of said optical wave-guiding member, operable to uniformly heat said optical wave-guiding member to effect a change in temperature as the state change.

5. A wavelength router comprising:

a substrate;

a plurality of optical waveguides, which mutually intersect at an intersecting part of the waveguides, said optical waveguides being located on said substrate;

cladding adjacent to said optical waveguides;

a ring-type resonator, located near the intersecting part of the optical waveguides, capable of coupling said optical waveguides;

a control portion, located above said ring-type resonator, operable to effect a state change of said ring-type resonator at least between a first state and a second state so as to control the refractive index of said ring-type resonator; and a layer having a refractive index lower than the refractive index of said ring-type resonator, located between said ring-type resonator and said control portion;

wherein said ring-type resonator and said cladding are formed such that: the refractive index of said ring-type resonator in the first state is greater than the refractive index of said cladding; and the refractive index of said ring-type resonator in the second state is effectively equal to the refractive index of said cladding;

wherein said control portion is further operable to apply the state change to said cladding; said cladding and said ring-type resonator are formed from respective materials that exhibit opposite refractive index change characteristics from one another when the state change is effected; and wherein said plurality of optical waveguides and said cladding are formed using material and under formation conditions such that the optical waveguides and the cladding exhibit similar refractive index change characteristics and the refractive index change characteristics of the optical waveguides and the cladding have a difference that does not depend on temperature, such that the refractive indexes of the optical waveguides, the cladding, and the ring-type resonator are not the same at any state.

6. The wavelength router according to claim 5, wherein: said control portion is operable to effect the state change to a third state; and the refractive index of said ring-type resonator is higher than the refractive index of said cladding in the third state, and is different from the refractive index of said ring-type resonator in the first state.

7. The optical switch element according to claim 6, wherein said control portion is a heater, provided above said layer having a refractive index lower than the refractive index of said ring-type resonator, operable to uniformly heat said ring-type resonator to effect a change in temperature as the state change.

8. The wavelength router according to claim 5, wherein said cladding is formed from organic materials, and said ring-type resonator is formed from material containing quartz.

9. The optical switch element according to claim 5, wherein said control portion is a heater, provided above said layer having a refractive index lower than the refractive index of said ring-type resonator, operable to uniformly heat said ring-type resonator to effect a change in temperature as the state change.

* * * * *